United States Patent
Boling et al.

(10) Patent No.: US 9,332,404 B2
(45) Date of Patent: May 3, 2016

(54) SERVER ABSTRACTED MESSAGING SYSTEM

(71) Applicant: SPIREON, INC., Knoxville, TN (US)

(72) Inventors: Brian Boling, Knoxville, TN (US); Sri Valarino, San Clemente, CA (US)

(73) Assignee: Spireon, Inc., Knoxville, TN (US)

( * ) Notice: Subject to any disclaimer, the term of this patent is extended or adjusted under 35 U.S.C. 154(b) by 441 days.

(21) Appl. No.: 13/832,199

(22) Filed: Mar. 15, 2013

(65) Prior Publication Data

US 2014/0280658 A1    Sep. 18, 2014

(51) Int. Cl.
| | |
|---|---|
| G06F 15/16 | (2006.01) |
| H04W 4/12 | (2009.01) |
| H04L 12/58 | (2006.01) |
| H04W 4/02 | (2009.01) |

(52) U.S. Cl.
CPC .............. *H04W 4/12* (2013.01); *H04L 51/16* (2013.01); *H04W 4/02* (2013.01)

(58) Field of Classification Search
CPC .............................. H04L 51/16; H04W 4/12
USPC ........................................................ 709/207
See application file for complete search history.

(56) References Cited

U.S. PATENT DOCUMENTS

| | | | |
|---|---|---|---|
| 6,018,766 A | 1/2000 | Samuel et al. | |
| 7,593,948 B2 * | 9/2009 | Suggs et al. | |

OTHER PUBLICATIONS

"Abstract Server Design," published by the Fermi National Accelerator Laboratory at least as early as Sep. 13, 2004.
Ramilli and Prandini, "A Messaging-Based System for Remote Server Administration," Proceedings of the 2009 Third International Conference on Network and System Security, pp. 262-269, published in 2009.
La Porta, et al., "Experiences with Network-Based User Agents for Mobile Applications," published by Mobile Networks and Applications 3 (1998), pp. 123-141.

* cited by examiner

*Primary Examiner* — Ario Etienne
*Assistant Examiner* — Sahera Halim
(74) *Attorney, Agent, or Firm* — Luedeka Neely Group, P.C.

(57) ABSTRACT

A server abstracted messaging system interfaces to networking services such as SMS, UDP and IP, using internally implemented protocols or third-party tools. All connections, disconnections, errors or intricacies in service decoding are abstracted by the messaging system. To interface to an LBS device, the messaging system uses a special language to communicate with that device, leaving the actual translation of the command to the device until the very end, thereby abstracting the communication to the device by any application. All new commands for the LBS device are implemented in the abstracted language.

14 Claims, 11 Drawing Sheets

SERVER ABSTRACTED MESSAGING SYSTEM

FIELD

This invention relates to the field of electronic communication of messages across communication networks. More particularly, this invention relates to a system for communicating messages over multiple communication networks to and from mobile devices that communicate using various different communication protocols.

BACKGROUND

Mobile communication devices use various services and protocols for communicating information across wireless communication networks. For example, Short Messaging Service (SMS) is used for text messaging and General Packet Radio Service (GPRS) is used for data transmission. Computer applications communicate over Internet Protocol (IP) networks using protocols such as User Datagram Protocol (UDP). Web services use Extensible Markup Language (XML) to represent data structures for communication over the Internet and other IP networks.

Such networking services and protocols are constantly evolving to meet the growing demand for efficient and fast data communications between mobile devices. Location Based Service (LBS) devices, such as automotive tracking and communication devices, cargo/container monitoring devices, and fleet vehicle tracking devices, are being introduced that use various different protocols for transmitting status information and receiving commands. Efficiently communicating messages to and from these various LBS devices over wireless communication networks and the Internet has become increasingly challenging.

What is needed, therefore, is a messaging system that can efficiently interface any LBS device to any networking service using current and yet to be developed protocols.

SUMMARY

The above and other needs are met by a server abstracted messaging system. To interface to networking services such as SMS, UDP and IP, the system uses internally implemented protocols or third-party tools. All connections, disconnections, errors or intricacies in service decoding are abstracted by the messaging system. To interface to an LBS device, the messaging system uses a special language to communicate to that device, leaving the actual translation of the command to the device until the very end, thereby abstracting the communication to the device by any application. All new commands for the LBS device are implemented in the abstracted language.

In preferred embodiments, the messaging system is designed to be failsafe by using a separate thread for each messaging event. A thread is an individual process that does not affect the operation of the main messaging system process. As implemented in the abstracted messaging system, a thread may fail but the main process remains alive and no other transactions are affected by the failed thread. Thread-safe queues store messages until they are ready to be processed.

In a preferred embodiment, messages are received by a fast, non-blocking message receiver that places the messages into the main queue. Message handling is done either by dedicated threads (also referred to as processors) or by code invoked only upon the receipt of a message (also referred to as handlers.) A queue manager dispatches messages to the appropriate handlers or processors. Each processor preferably has its own queue of messages awaiting processing, so it may asynchronously work its way through the messages in the queue. Message handlers are placed in another queue to await execution by handler runner threads.

The messaging system consists of several "instances" that are each designed for a specific protocol and a specific LBS device. Each instance is preferably optimized using conditional compilation, thereby disabling sections of code and routines that are not needed for proper execution of the current instance.

Preferred embodiments of the messaging system use a Structured Query Language (SQL) database to capture all messaging system transactions and to communicate between the messaging system and applications.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
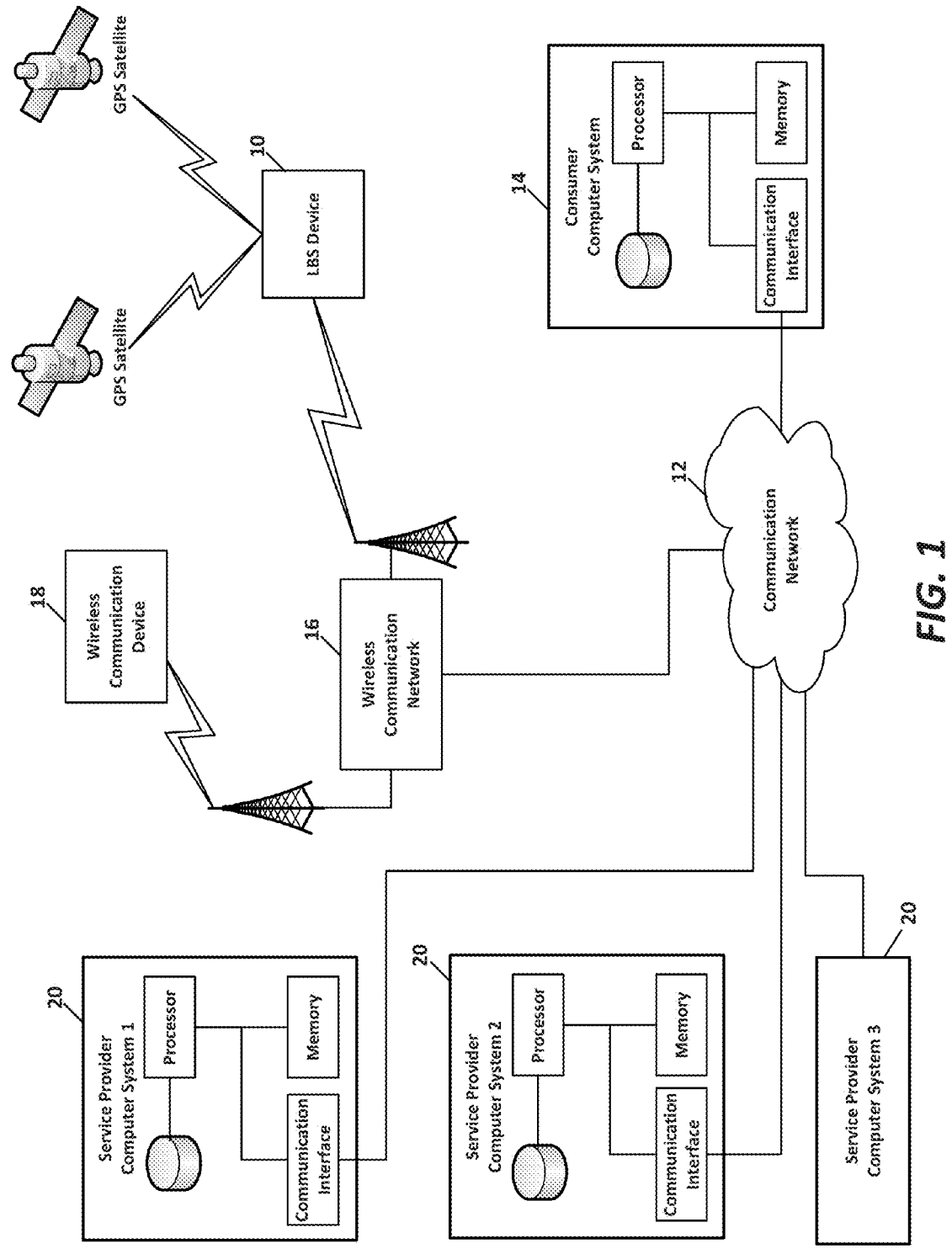
FIG. 1 depicts computers, wireless communication devices and LBS devices interface together via wireless communication networks and the Internet.

As shown in FIG. 1, Location Based Service (LBS) devices 10 are in communication with a wireless communication network 16 that is connected to a wide area communication network 12, such as the Internet. LBS devices 10 generally include any wireless device having means to determine its location and report its location or perform some function based on its location. Examples of LBS devices 10 include automotive tracking devices, personal tracking devices, pet tracking devices, cargo/container tracking devices, fleet vehicle tracking devices, emergency locator beacons, and security/fire alarm monitoring devices. Such devices may determine location coordinates using signals transmitted by Global Positioning System (GPS) satellites.

Mobile wireless communication devices 18, such as cell phones, smart phones and tablet computers, are also in communication with the network 16. These devices 18 may also be capable of determining location and providing services based on location, and thus are also considered to be LBS devices.

Multiple service provider computer systems 20 are also connected to the network 12. These systems, which may also be referred to herein as servers, provide location based services to end users or consumers. For example, one of the service provider computer systems 20 may provide tracking information for mapping the location of fleet vehicles or cargo containers. Another of the service provider computer systems 20 may monitor the location of people, or pets, or personal automobiles, and provide such information on a subscription basis to end users via websites. Yet another of the service provider computer systems 20 may monitor emergency signals transmitted by emergency locator beacon devices via the COSPAS-SARSAT emergency rescue satellite system and provide location information to search and rescue authorities. The location based services provided by the service provider computer systems 20 are accessed by consumers using consumer computer systems 14 connected to the communication network 12.

Figure 2:
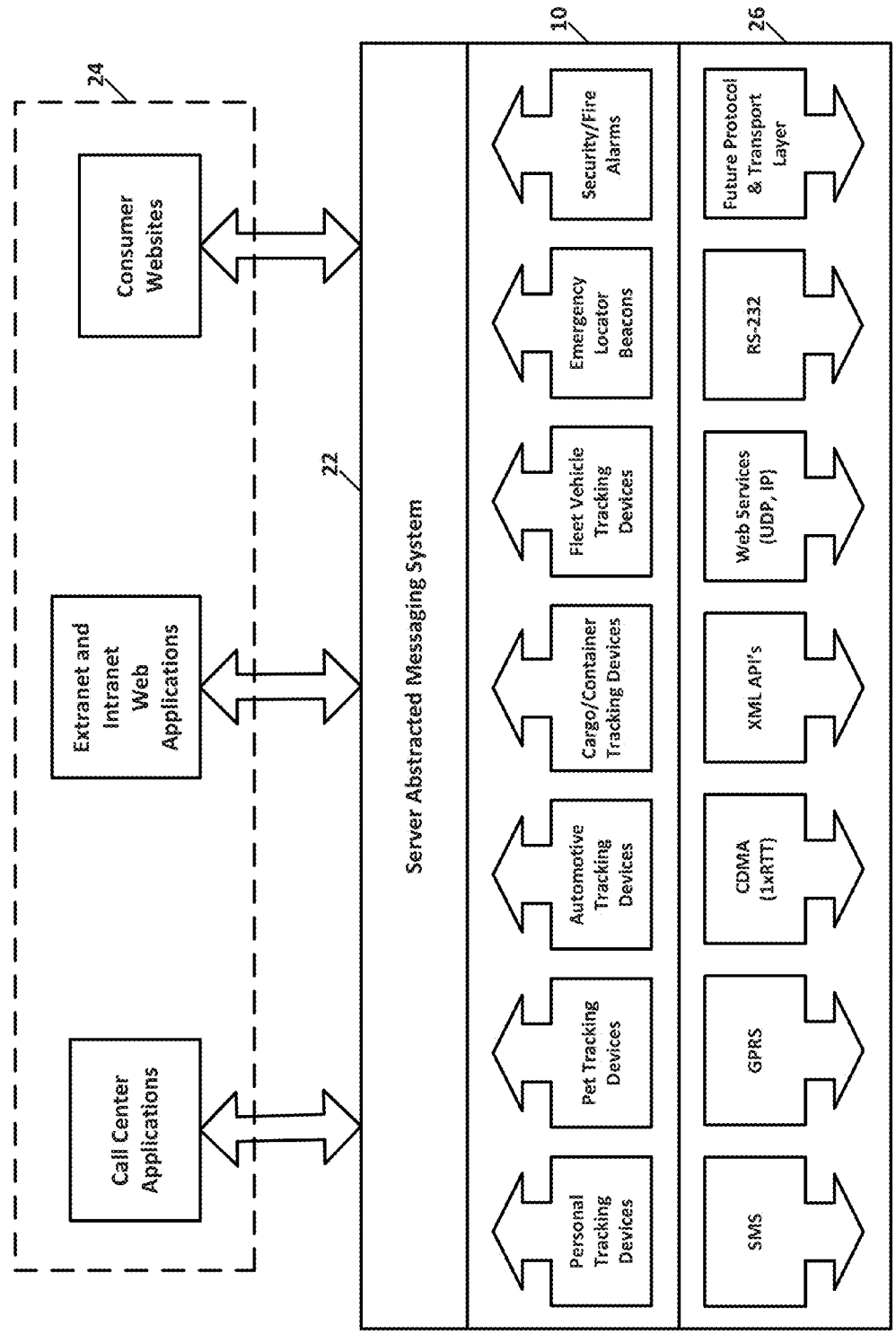
FIG. 2 depicts a server abstracted messaging system according to a preferred embodiment.

As shown in FIG. 2, various LBS devices 10 communicate over communication networks using various communication protocols 26, such as Short Messaging Service (SMS), General Packet Radio Service (GPRS) and Code Division Multiple Access (CDMA). Other devices, such as security systems and fire alarm systems, may communicate using RS-232. Information from the LBS devices 10 may be used by various software applications 24 running on the service provider computer systems 20, such as call center applications (i.e., OnStar), corporate extranet and intranet web applications, and consumer websites. These service provider applications 24 may communicate over the Internet and other wide area networks using protocols 26 such as User Datagram Protocol (UDP) and Extensible Markup Language (XML). As described herein, preferred embodiments of a server abstracted messaging system (SAMS) 22 efficiently communicate messages between the LBS devices 10 and the applications 24 using the various communication protocols 26.

Figure 3:
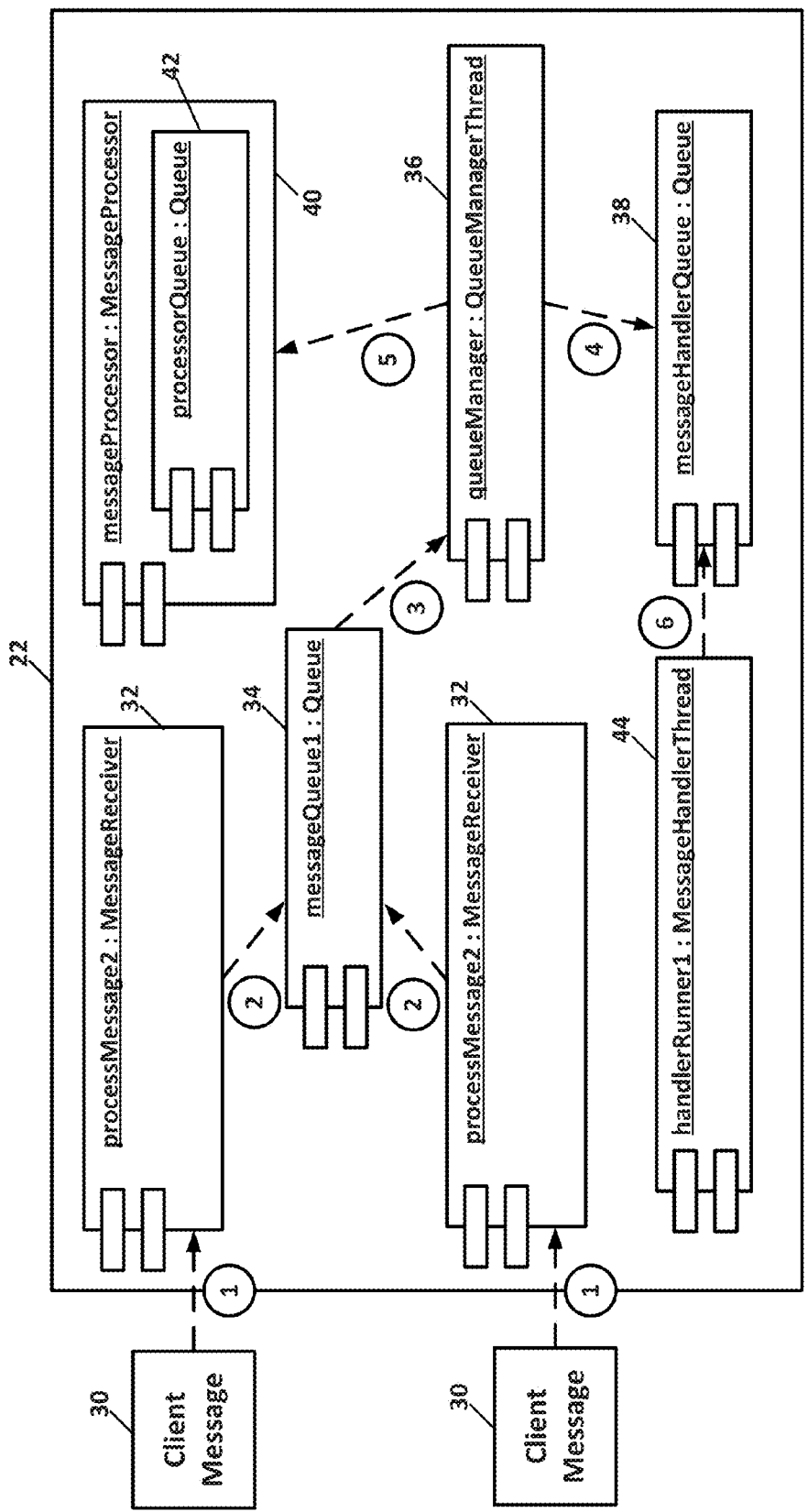
FIGS. 3 and 4 depict message flow through the server abstracted messaging system according to a preferred embodiment.
Figure 4:
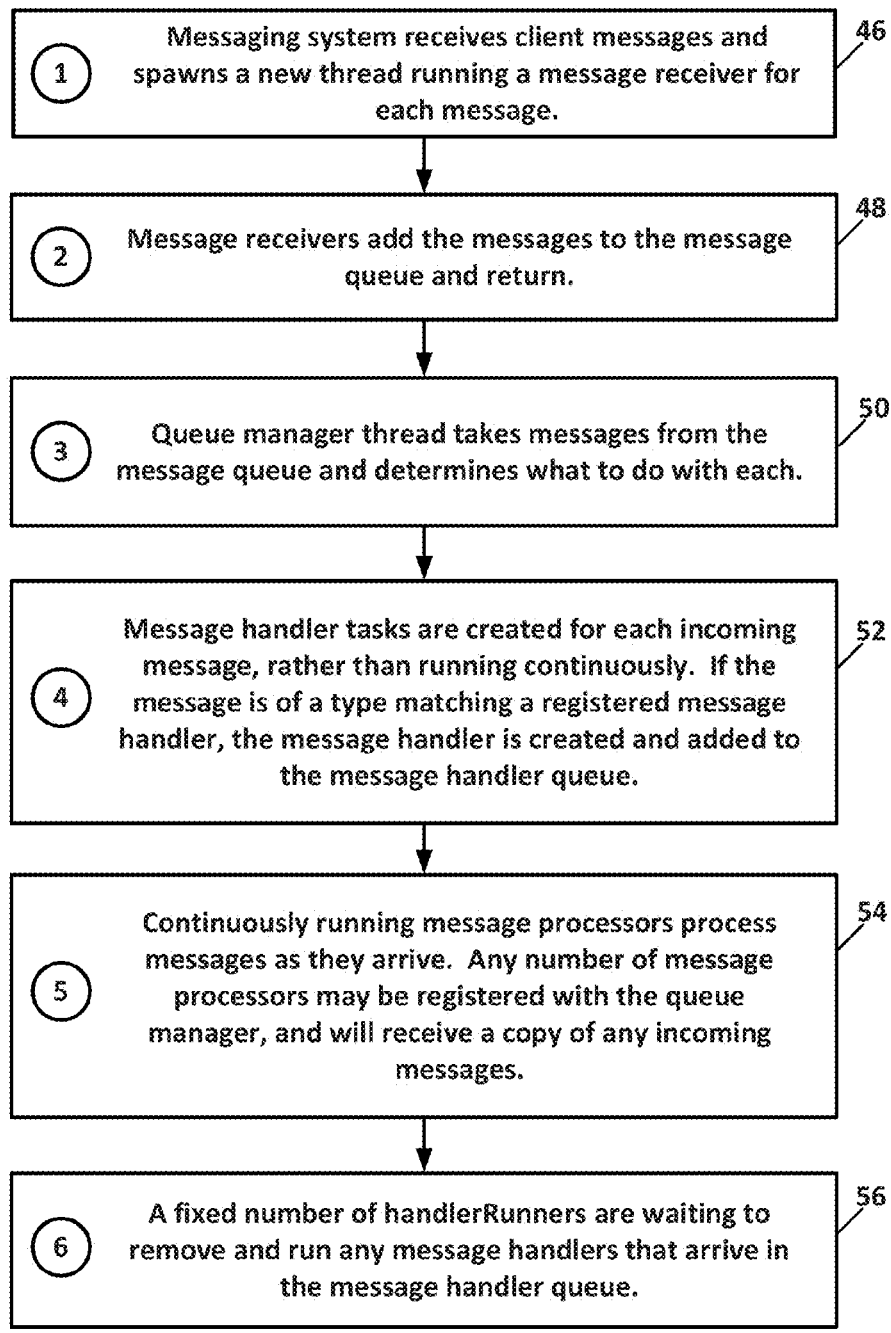

FIGS. 3 and 4 depict message flow through the SAMS 22 according to a preferred embodiment. For each received client data message 30, the SAMS 22 spawns a new message receiver thread 32 (step 46 of FIG. 4). The message receiver thread 32 adds the message to the message queue 34 (step 48). A queue manager thread 36 takes the message from the message queue 34 and determines how the message should be handled (step 50). A message handler task is created and added to the message handler queue 38 for each incoming message type that matches a registered message handler type (step 52). Message processors 40, which are continuously running tasks, process messages as they arrive (step 54). Any number of message processors 40 may be registered with the queue manager thread 36. A fixed number of handler runners 44 are waiting to remove and run message handlers that arrive in the message handler queue 38 (step 56).

Queue Manager

Figure 5:
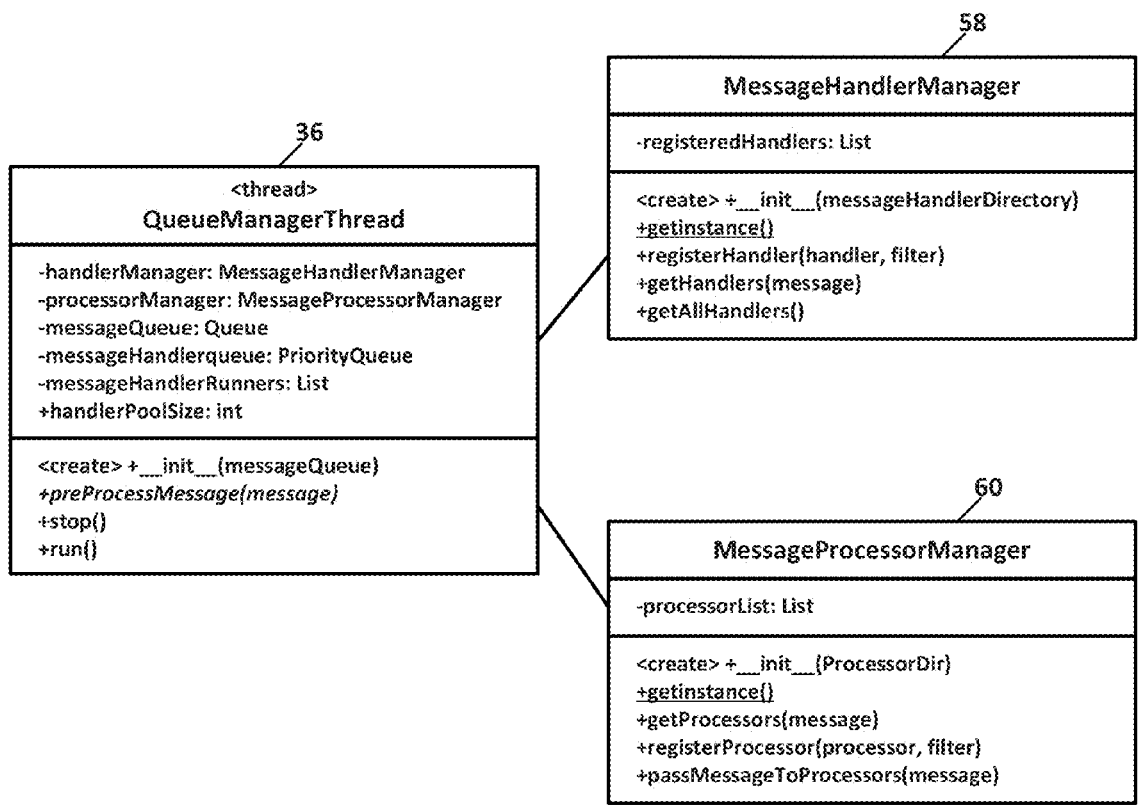
FIGS. 5-11 depict queue managers, message handlers, message processors, and message receivers of a server abstracted messaging system according to a preferred embodiment.

The queue manager thread 36 pulls messages out of the message queue 34 and determines what to do with them by determining which message handlers and message processors are "interested" in each message. As shown in FIG. 5, singleton classes MessageHandlerManager 58 and MessageProcessorManager 60 hold information indicating which message handlers are available and which messages they should receive. These classes 58 and 60 maintain a list of message handlers and message processors that are registered. Registration is done either by calling a registerHandler or registerProcessor method, or by scanning a directory for the relevant classes and registering them all.

The queue manager thread 36 invokes the abstract method preProcessMessage prior to invoking any message handlers or message processors. This method can be used, for example, to unpack a CORBA representation in the message.

Figure 6:
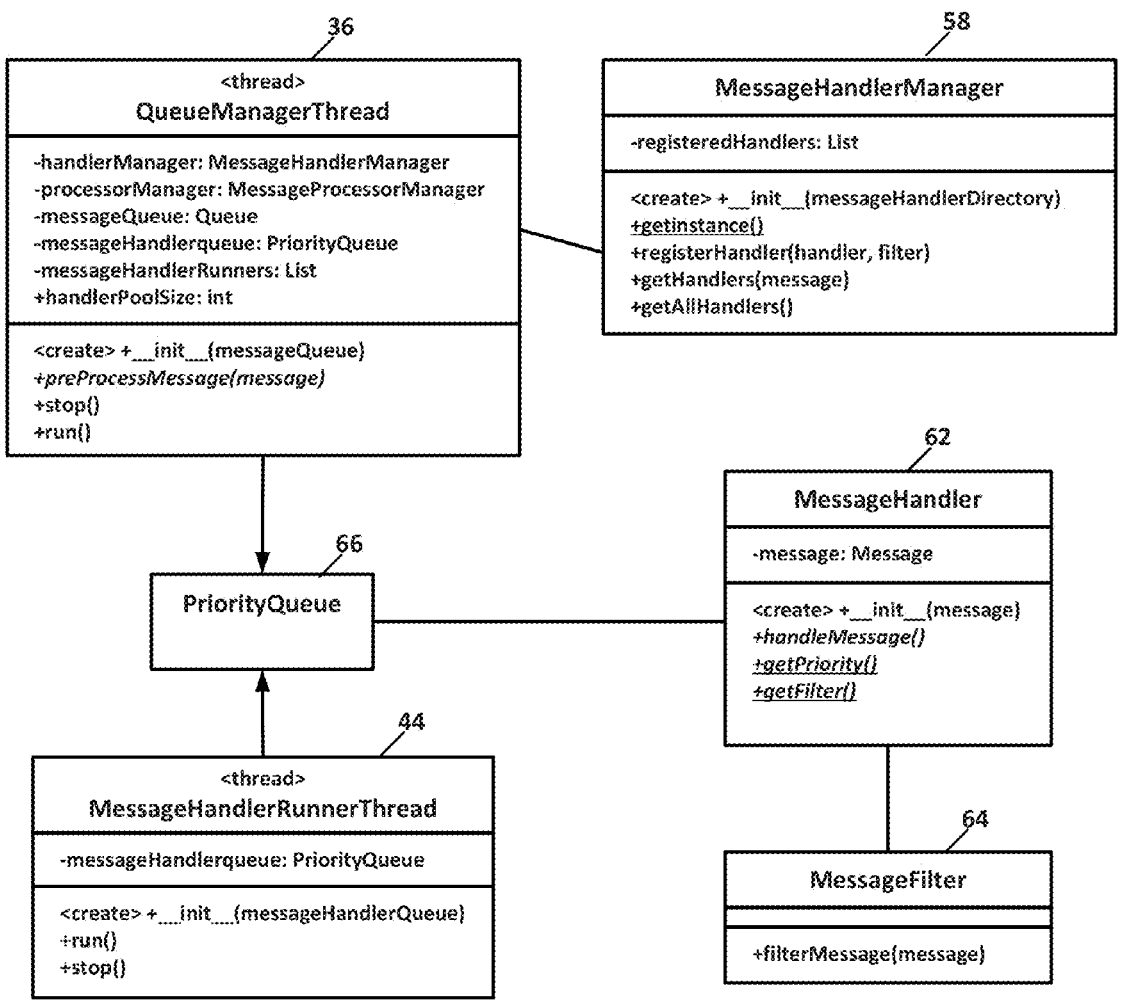

As shown in FIG. 6, a message filter 64 is defined to determine which messages that a message handler 62 or message processor 40 should receive. The message filter 64 is an abstract class having one method—filterMessage—that returns true if the message handler 62 is interested in the message.

Message Handlers

So as not to burden the main message queue 34, message handlers 62 run in their own message handler runner threads 44. A pool of these threads is started by the queue manager thread 36. These threads 44 monitor the message handler queue 38, taking message handlers 62 from the queue 38 one at a time and running them. The message handlers 62 were inserted into the queue 38 by the queue manager thread 36 after being looked up in the message handler manager 58. As shown in FIG. 6, the message handler 62 invokes the abstract method handleMessage to do the work. Each message handler 62 may be assigned an integer priority value. The handlers 62 having the highest priority will be given to the runner thread 44 first.

Message Processors

Figure 7:
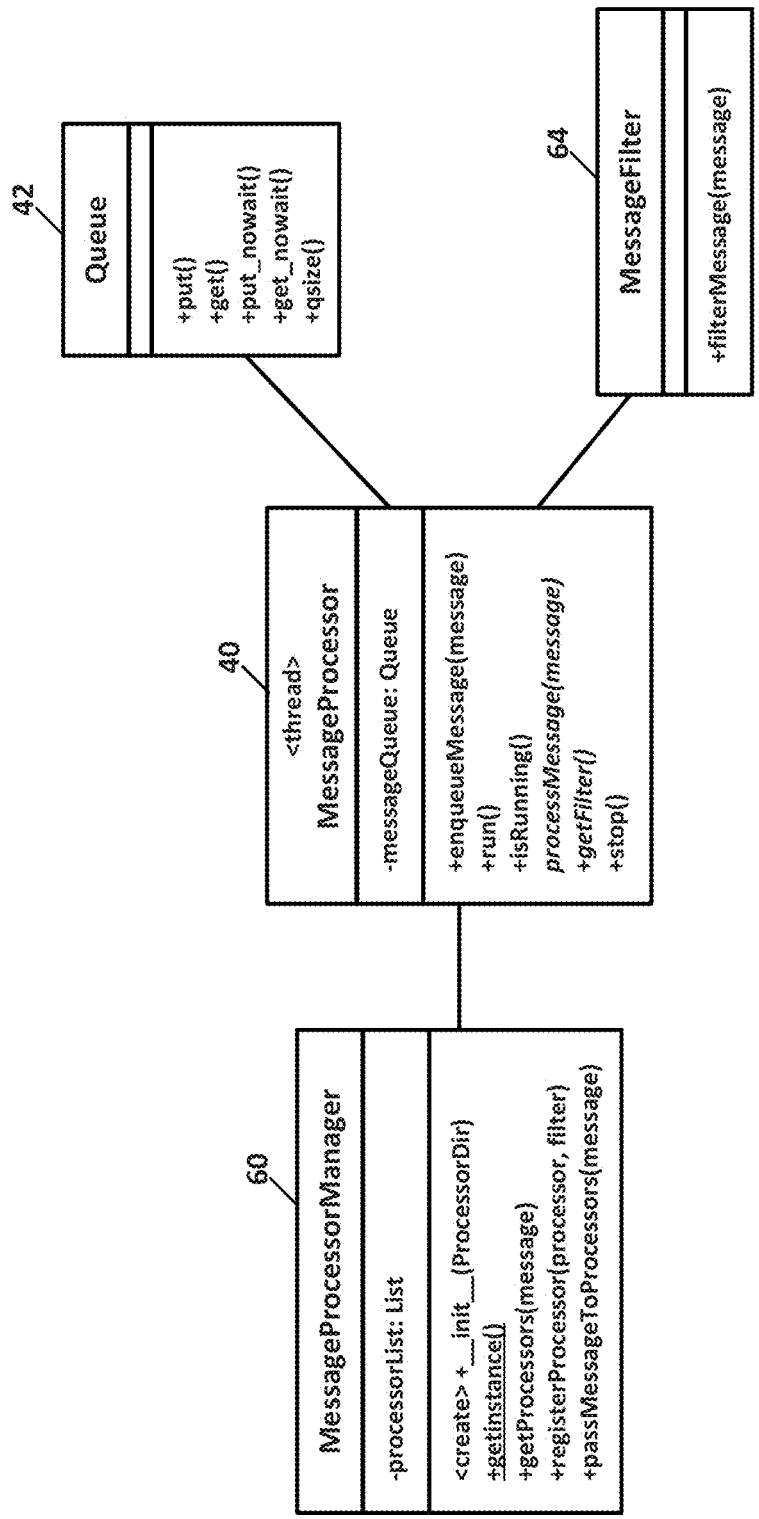

As shown in FIG. 7, message processor threads 40 receive the messages next. The queue manager thread 36 passes each message to the message processor manager 60 (FIG. 5) which in turn passes it to all relevant processors by calling passMessageToProcessors. The message then stays in the processor queue 42 until the message processor thread 40 calls the abstract method processMessage. When processMessage terminates, the message processor thread 40 "sleeps" until a new message is ready to be processed. Message processor threads 40 are started as they are registered.

Order of Execution

In preferred embodiments, if the order of execution of message-related code is important, then the order should be specified in the preProcessMessage method in the queue manager thread 36. Message processors 40 run completely asynchronously. Thus, even if they are given messages in a particular order, one message processor 40 may take longer than another to get around to processing a message, so that the order in which they actually begin processing is undefined.

As discussed above, message handlers 62 are inserted into a priority queue 66. Thus, even if higher-priority message handlers 62 are started before lower-priority ones, they are not guaranteed to finish first unless there is only one active handler runner thread 44. Thus, any code that depends critically on other code being completed first must all be in one handler. Alternatively, the first part of the code should be in the preProcessMessage method of the queue manager thread 36 or there must be only one handler runner thread.

Event Monitoring

Figure 8:
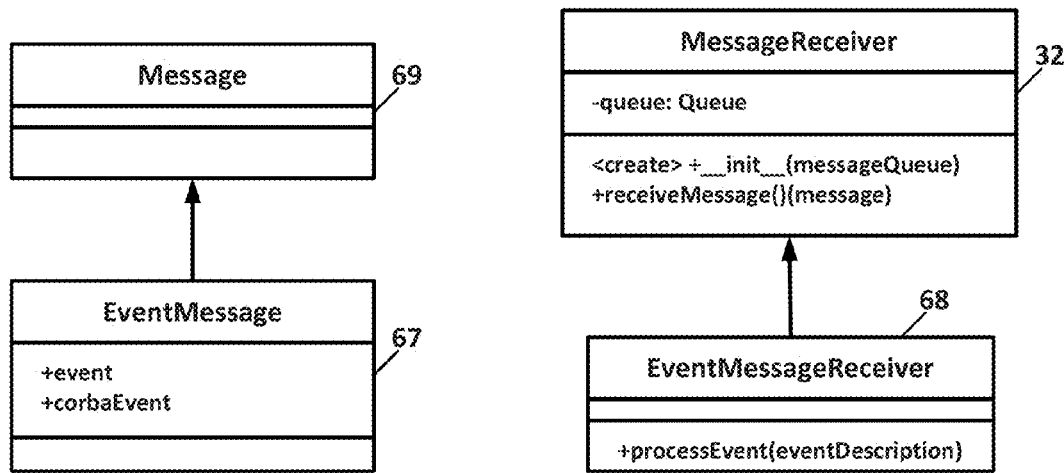

In the monitoring service, events are passed to the processEvent method of the EventMessageReceiver remote interface 68 as shown in FIG. 8. This class is a subclass of the MessageReceiver server class. The processEvent method wraps the event description in a message object and puts it in the message queue 34.

Figure 9:
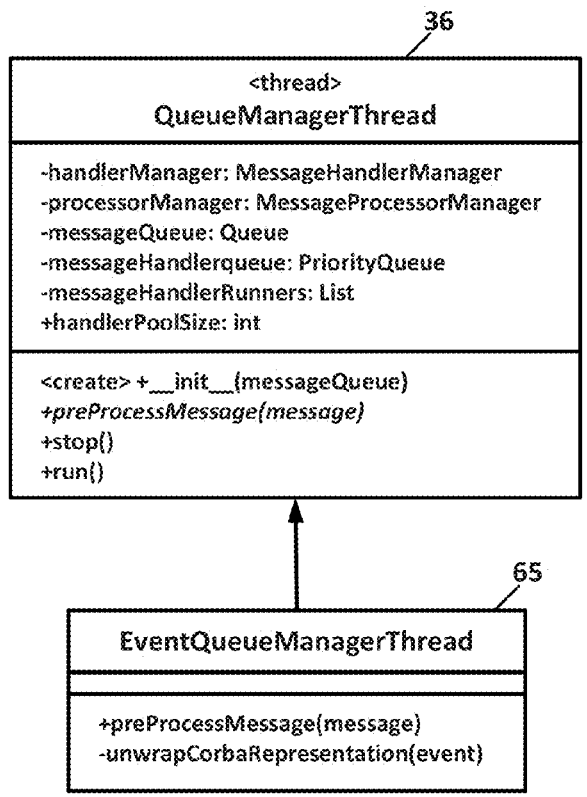

As shown in FIG. 9, the QueueManagerThread 36 is subclassed to provide a preProcessMessage method that can unwrap the CORBA representation of the event and provide a version for use by message handlers and message processors.

Figure 10:
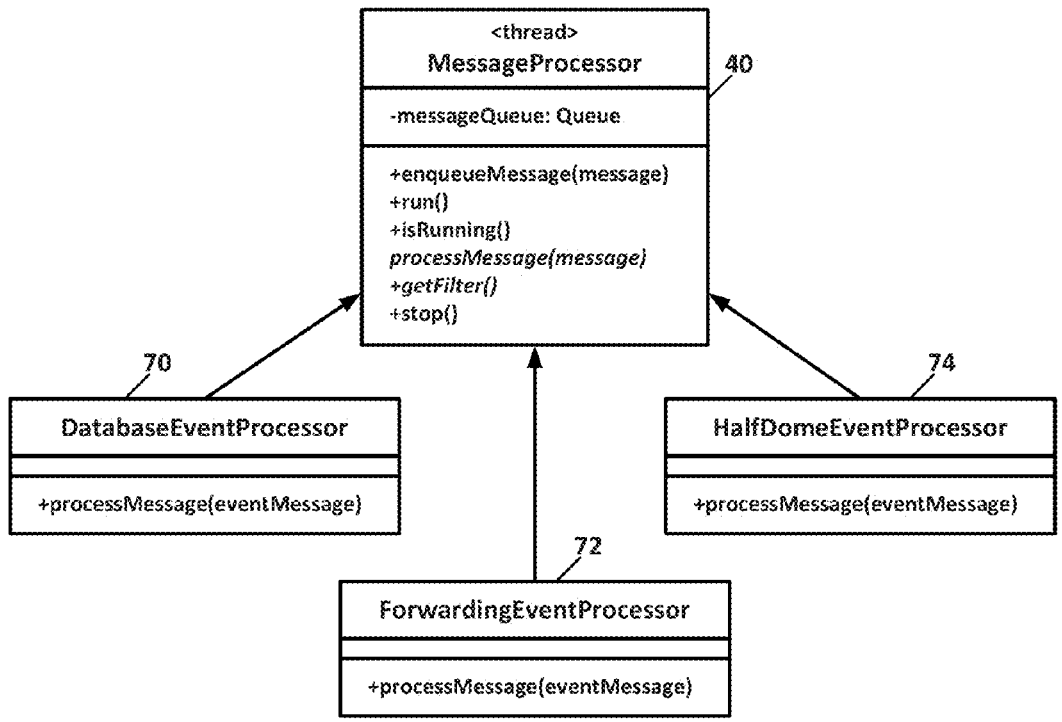

As shown in FIG. 10, the MessageProcessor thread 40 is subclassed to provide services that are applied to all events, the DatabaseEventProcessor 70, and the HalfDomeEventProcessor 74, which will pass the message to other monitoring systems if necessary. The ForwardingEventProcessor 72 forwards events to upstream messaging servers so as to provide scalability to run the messaging system across several machines. For example, one server could provide database logging and another server could provide real-time monitoring.

Figure 11:
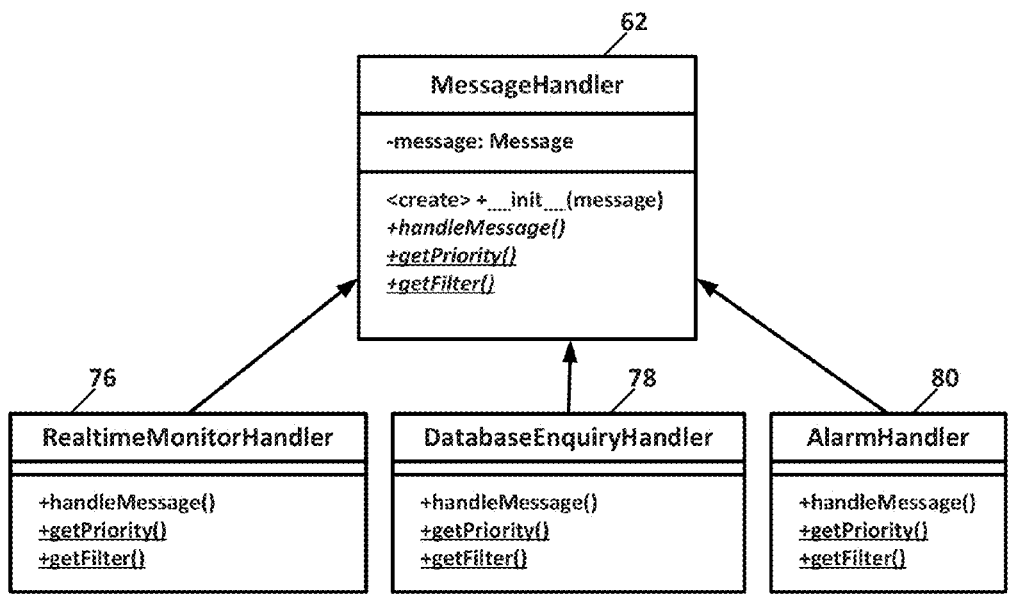

As shown in FIG. 11, forwarding to real-time monitoring is handled by a RealtimeMonitorHandler 78 having a filter so that only relevant events are given to the message handler 62. DatabaseEnquiryHandler 78 handles requests for event histories and AlarmHandler 80 sends out alarms.

Database Connections

Figure 12:
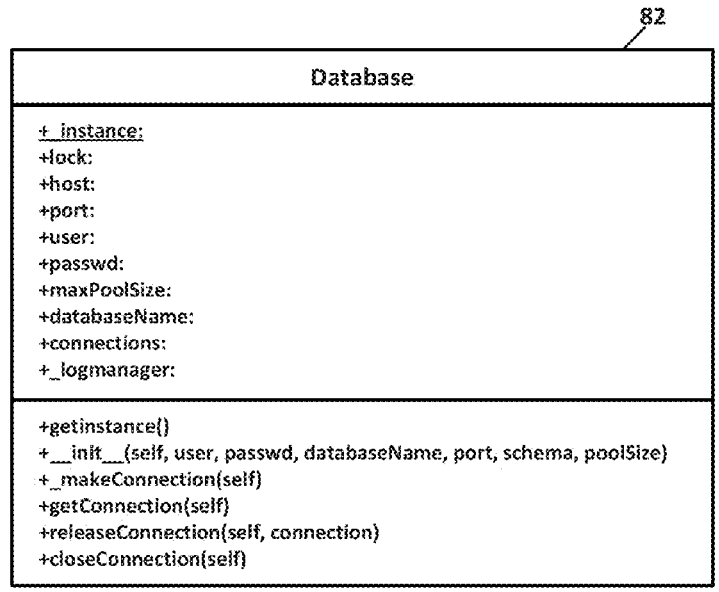
FIGS. 12 and 13 depict database connections of a server abstracted messaging system according to a preferred embodiment.

As shown in FIG. 12, database connections are handled by a connection pooling database class 82. Threads may request connections from and to the database, and connections are returned after use.

Figure 13:
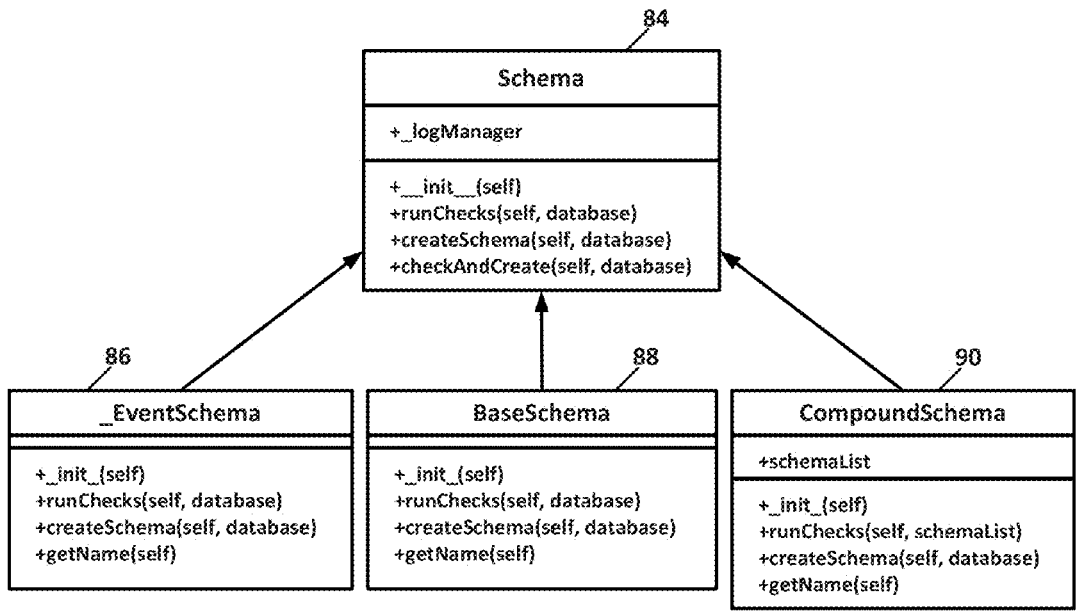

As shown in FIG. 13, the database class 82 also provides for schema management. A schema object 84 has abstract methods to check whether a schema is present and create it if necessary. The compound schema 90 checks for and creates any missing schemas in its schema list. The schema 84 is made from a combination of the base schema 88, which provides a version management table, and the events schema 86, which provides the necessary tables below for storing events.

Events Table

| Field | Type | Null | Key | Default | Extra |
|---|---|---|---|---|---|
| ID | varchar(50) | | PRI | | |
| Type | varchar(50) | | | | |
| Time | datetime | Yes | | Null | |
| ParentID | varchar(50) | Yes | | Null | |
| ProducerID | varchar(50) | Yes | | Null | |
| DictionaryID | bigint(20) | Yes | MUL | Null | |

EventDictionary Table

| Field | Type | Null | Key | Default | Extra |
|---|---|---|---|---|---|
| DictionaryID | bigint(20) | | | 0 | |
| KeyID | bigint(20) | | | 0 | |
| Value | text | Yes | | Null | |

DictionaryKeys Table

| Field | Type | Null | Key | Default | Extra |
|---|---|---|---|---|---|
| KeyID | bigint(20) | | PRI | 0 | |
| DictionaryKey | varchar(50) | | | Null | |

Application Programming Interface

To communicate a messages between a client computer and an LBS device, a preferred embodiment of the server abstracted messaging system inserts a command into the SQL database using a yQueue_Command. The command has a state selected from one of those listed in the Queue State Table below.

Queue State Table

| State | Definition |
|---|---|
| 100 | Command from Client |
| 200 | Command sent to Device |
| 300 | Command received by Device |
| 400 | Scheduled Commands |

Queue State Table (-continued)

| State | Definition |
|---|---|
| 500 | Response from Device successful |
| 600 | Alert from Device successful |
| 650 | Voice Message Alerts to Telephony resulting from 600 Alerts |
| 700 | Logs from Devices that dump data |
| 800 | Client received Response from Device successfully |
| 9100 | Command from Client not Parsed |
| 9110 | Command from Client not Implemented |
| 9120 | Command from Client not sent to Device |
| 9160 | Command from Client not accepted by XML API |
| 9190 | Command from Client not sent for unknown reason |
| 9200 | Response from Device not received: Timed Out" |
| 9500 | Response from Device not Parsed |
| 9510 | Response from Device not Implemented |
| 9520 | Response from Device not sent to Client |
| 9560 | Response error from XML API |
| 9570 | Response error from CalAmp Device (Message not acknowledged) |
| 9590 | Response error for unknown reason |
| 9600 | Alert from Device not Parsed |
| 9610 | Alert from Device not Implemented |
| 9620 | Alert from Device not logged to DB |
| 9660 | Alert error from XML API |
| 9690 | Alert error for unknown reason |
| 9691 | Alerts Not Logged |
| 9698 | Bogus 'Engine Overheat' Alert |
| 9699 | Alert should have been a response |

In the preferred embodiment, yQueue_Command is an SQL database procedure that is defined according to CREATE PROCEDURE [dbo].[yQueue_Command].

Procedure Table

| Field | Type | Default |
|---|---|---|
| @Command | VARCHAR(25) | |
| @Protocol | VARCHAR(20) | =NULL, |
| @DeviceTypeID | VARCHAR(20) | =NULL, |
| @MIN | VARCHAR(10) | =NULL, |
| @Serial | VARCHAR(20) | =NULL, |
| @Interval | BIGINT | =NULL, |
| @MaxSpeed | SMALLINT | =NULL, |
| @Fence | SMALLINT | =NULL, |
| @Radius | INT | =NULL, |
| @StampIn | DATETIME | =NULL, |
| @StampSchedule | DATETIME | =NULL, |
| @Application | VARCHAR(10) | =NULL, |
| @Who | VARCHAR(10) | =NULL, |
| @MessageID | VARCHAR(10) | =NULL, |
| @PIN | VARCHAR(4) | =NULL, |
| @ExtraParams | VARCHAR(255) | =NULL, |
| @Sequence | SMALLINT | OUTPUT |

In an example wherein the LBS device is a vehicle tracking unit, the @Command field may be one of the commands listed in the @Command Table below as implemented in the firmware of the LBS device.

@Command Table

ACKNOWLEDGE
AT
AUTOREPORT_ON
AUTOREPORT_OFF
AUTOREPORT_SET
AUTOREPORT_IGNOFF_SET
AUTOREPORT_IGNON_SET
BATTERYLEVEL_SET
FACTORY_SET
FIRMWARE_UPDATE

-continued

@Command Table

CLEAR_ALARMS
DRIVEREPORT_ON
DRIVEREPORT_OFF
DRIVEREPORT_SET
GEOFENCE_LOCAL_ON
GEOFENCE_LOCAL_OFF
GEOFENCE_LOCAL_TOGGLE
GEOFENCE_ON GEOFENCE_OFF
GEOFENCE_SET
LOCATE
LOCATE_GPRS
LOWPOWER_ON
LOWPOWER_OFF
MAXSPEED_REPORT
MAXSPEED_SET
MEMORY_RESET
MODE_DELAYED
MODE_HIGHPOWER
MODE_NORMAL
MODE_SLEEP
MODE_TRACK
PANIC_SET
PASSTHRU
PHONEBOOK_ADD
PHONEBOOK_DEL
REMOTE_START
SHOULDERTAP
STARTER_ON
STARTER_OFF
STARTER_ENABLE
STARTER_DISABLE
STATUS
STOPREPORT_SET
TRESHHOLD_HEADING_SET
TRESHHOLD_SPEED_SET
TRESHHOLD_RPM_SET
TRESHHOLD_MILEAGE_SET
TRESHHOLD_ACCEL_SET
TRACK_ON
TRACK_OFF
UNLOCK_DOORS
WARNING_ON
WARNING_OFF

Example of Abstracted Messaging System Operation

Figure 14:
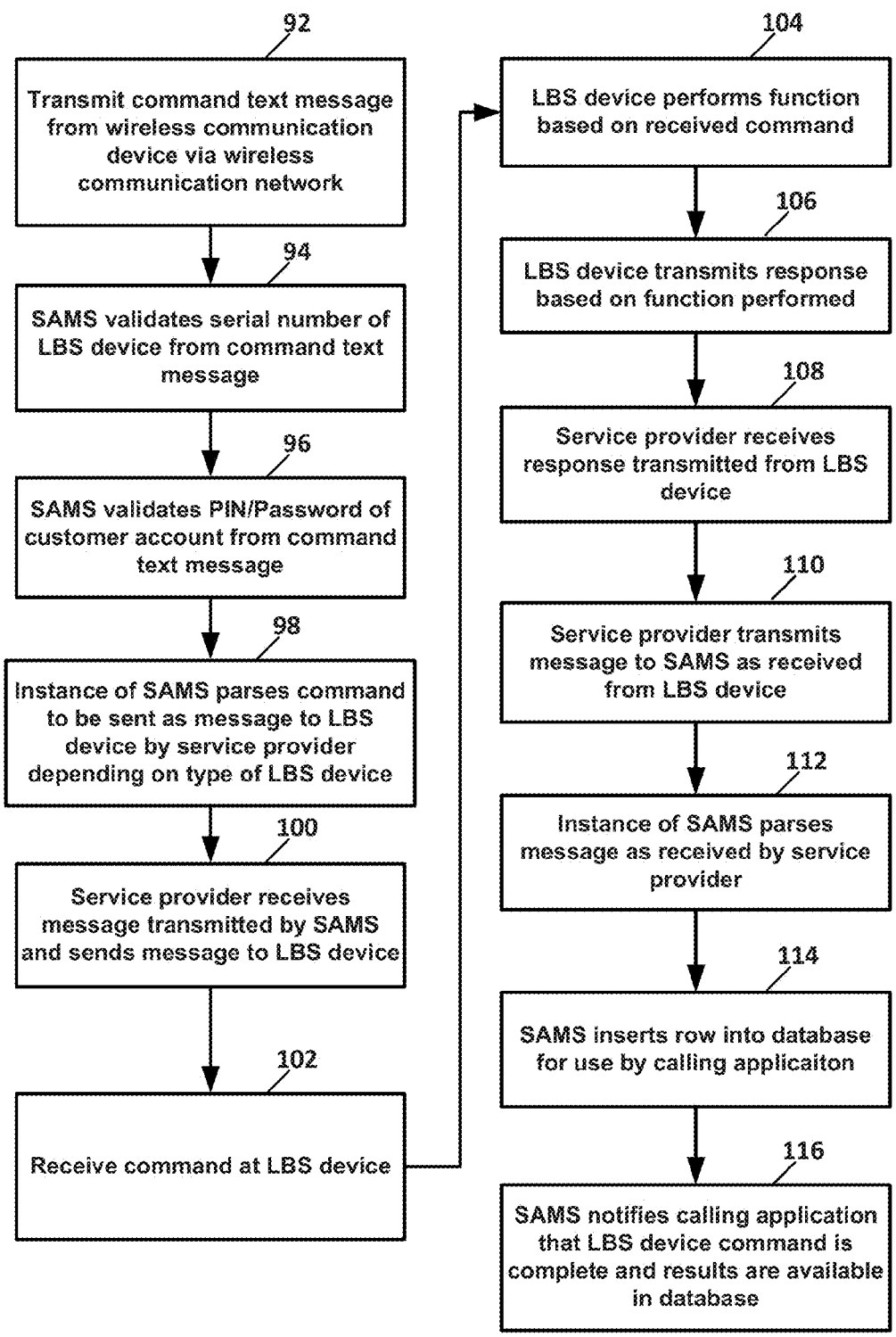
FIG. 14 depicts communication with an LBS device using the server abstracted messaging system according to a preferred embodiment.

Shown in FIG. 14 is one embodiment of a method for communicating between the wireless communication device 18 (FIG. 1) and the LBS device 10 using a text messaging protocol, such as SMS. To begin a communication session, a user of the wireless communication device 18 enters a text message, such as in the following format, which is transmitted via the wireless communication network 12 (step 92):

To: <ShortCode>
Msg: <Serial><b><PIN/Password><b><Command> where:
<ShortCode>=four (4) or five (5) digit code corresponding to the Common Short Code (CSC) assigned to the service provider computer system 20 (FIG. 1);
<Serial>=serial number of the LBS device 10;
<b>=a space or "blank" character;
<PIN/Password>=four (4)-digit Personal Identification Number (PIN) or case-sensitive Password assigned to the user's account to which the serial number of the LBS device 10 has been registered; and
<Command>=an LBS command that will be transmitted to the LBS device 10. In one embodiment, <Command> can have the following values:
"1" (one), "l" (lower-case L) or "L" (upper-case L)=LOCATE the LBS device 10;
"2" (two), "d" (lower-case D) or "D" (upper-case D)=DISABLE STARTER of the automobile or asset in which the LBS device 10 is installed;
"3" (three), "e" (lower-case E) or "E" (upper-case E)=ENABLE STARTER of the automobile or asset in which the LBS device 10 is installed; and
"9" (nine), "u" (lower-case U) or "U" (upper-case U)=UNLOCK the doors of the automobile or asset in which the LBS device 10 is installed.

The text message in the above format is communicated through the wireless communication network 16 and the wide area communication network 12 to the service provider computer system 20 (step 94). In a preferred embodiment, the service provider computer system 20 receives and parses the command text message transmitted from the wireless communication device 18 and validates that the serial number is in a valid serial number format and properly registered to a customer of the service provider (step 96) as indicated by records stored in the service provider's database. Although the user does not necessarily have to be the user to which the serial number of the LBS device 10 has been registered, once the user is authenticated, the user is deemed to be authorized to use the service.

If the serial number is not in the expected format or is not properly registered to a customer, then a report text message is returned to the wireless communication device 10 (via the communication networks 12 and 16) in the following format:

trakSMS™—Serial number <Serial> is not valid.

In this case, the communication session is deemed complete but unsuccessful.

If the serial number is valid, the service provider computer system 20 authenticates the submitted PIN/Password against the customer's account to which the serial number of the LBS device 10 has been registered (step 98). If the PIN/Password cannot be authenticated to the customer's account, then the following report text message is returned to the wireless communication device 18 (via the communication networks 12 and 16):

trakSMS™—PIN/Password=<PIN/Password> could not be authenticated for Serial Number <Serial>.

In this situation, the transaction is deemed complete but unsuccessful.

Once the serial number has been validated and the PIN/Password authenticated, the service provider computer system 20 sends the LBS command to the LBS device 10 identified by the serial number <Serial> (step 100). The LBS device 10 receives the LBS command and processes the command to determine what function is to be performed. The LBS device 10 then performs the function, such as determining and transmitting location information, disabling/enabling the starter or unlocking the doors (step 104). The LBS device 10 also transmits a response based on the function performed (step 106).

The service provider computer system 20 continuously looks for the response transmitted from the LBS device 10. Once a response is received, the service provider computer system 20 parses and interprets the response (step 108) and constructs a report text message to be sent to the wireless communication device 18 (step 110). The report text message is forwarded via the communication network 12 to the wireless network 16 (step 112) and is transmitted via the wireless network 16 to the wireless communication device 18 (step 114).

If the LBS device 10 has responded properly, the wireless communication device 18 will receive a report text message in the following format which is displayed on the display screen of the wireless communication device 18 (step 116):

trakSMS™—<Response> for Serial <Serial> on <Time>—Nearest Address: <NearestAddress>—Speed: <Speed>—Direction: <Direction> where:
    <Response> corresponds to the <Command> submitted as described above and may have the following values:
        Location;
        Starter Disabled;
        Starter Enabled; and
        Unlock
    <Serial>=the serial number of the LBS device 10 as entered by the user;
    <Time>=the time at which the LBS command was completed (adjusted to the time zone corresponding the <Nearest Address>). Otherwise time is provided in UTC (Universal Time) format;
    <Nearest Address>=the address of the LBS device 10. The Nearest Address may be "Reverse Geocoded" from the GPS coordinates (Latitude and Longitude) provided by the LBS device 10 (when available);
    <Speed>=the speed provided by the LBS device 10 (when available) in MPH (miles per hour) or KPH (kilometers per hour); and
    <Direction>=the geographical direction provided by the LBS device 10 (when available) in a two-letter code (i.e., NW=North-West).

If the LBS device 10 has responded with an improper response, or the service provider computer system 20 did not receive a proper response from the LBS device 10, the wireless communication device 18 will receive a report text message in the following format which is displayed on the display screen of the wireless communication device 18 (step 116):
    trakSMS™—Serial number <Serial> could not be <Action>. Exception: <Exception> Please try later!
where:
    <Serial>=serial number of the LBS device 10 as submitted by the user.
    <Action> corresponds to the <Command> submitted as described above and may have the following values:
        Located;
        Starter Disabled;
        Starter Enabled; and
        Unlocked;
    <Exception>=description of exception (time-out, device not responding, etc.)

The server abstracted messaging system (SAMS) 22 running on the local computer systems 14 is involved in several of the steps of the process of FIG. 14.

In step 92, the LBS device 10 transmits a command text message via the wireless communication network 16.

In step 94, the SAMS 22 validates the serial number of the LBS device 10 that was provided by the calling application. The serial number is embedded into the command to be sent by the SAMS 22 to the LBS device 10 and exists in the database of the service provider 20.

In step 96, the SAMS 22 validates the PIN/password of the customer account. The PIN/password is provided by the calling application to the SAMS 22. In preferred embodiments, it is generally not necessary to forward this information to the LBS device 10.

In step 98, an instance of the SAMS 22 parses commands to be sent as a message to the LBS device 10 by the service provider 20. Each instance of the SAMS 22 is specifically designed to parse a message from one or more specific types of LBS devices 10.

In step 100, the service provider 20 receives a message transmitted by the SAMS 22 and sends the command message to the corresponding LBS device 10. The information regarding how to send the command message to the specific LBS device 10 is derived from the database of the service provider 20 and is passed by the calling application to the SAMS 22.

The LBS device 10 receives the command message (step 102), performs a function specified by the command message (step 104), and transmits a response message based on the function performed (step 106).

In step 108, the service provider 20 receives the response message transmitted from the LBS device 10.

In step 110, the service provider 20 transmits a message to the SAMS 22 based on the response message received from the LBS device 10.

In step 112, an instance of the SAMS 22 parses the message as received by the service provider 20. The information regarding how to parse the message is derived from the instance of the SAMS 22 that receives the message from the LBS device 10 through the service provider 20.

In step 114, the SAMS 22 inserts a row into a database for use by the calling application, including a success/failure code and geographic data as previously described.

In step 116, the SAMS 22 notifies the calling application that the LBS device command is now complete and the results are available in the database of the service provider 20. This is preferably done via a result code that the calling application checks periodically until the transaction is successful or has failed.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-implemented method for transferring electronic communications between a remote device and a location-based service (LBS) device, where the remote device communicates in a first protocol that is incompatible with a second protocol in which the LBS device communicates, the method comprising executing on a processor the steps of:
    receiving and storing into a memory of a computer a first message in the first protocol from the remote device,
    parsing information from the first message, wherein the parsing comprises,
        scanning the first message for an identifier of the LBS device to which the first message is directed, and storing the identifier in a database in the memory,
        scanning the first message for a pass code, and storing the pass code in the database in the memory, and
        scanning the first message for a command code, and storing the command code in the database in the memory,
    processing the information extracted from the first message, wherein the processing comprises,
        comparing the identifier to a database of identifiers to confirm that the LBS device to which the first message is directed is associated with the computer and to identify the second protocol for the LBS device, and comparing the pass code to a database of pass codes to confirm that the message is authorized to be communicated, creating a new message comprising the command, where the new message is formatted according to the second protocol associated with the LBS device, sending the new message to the LBS device, continually checking for a first response from the LBS device, upon receipt of the first response from the LBS device, parsing the first response by scanning for a confirmation of execution of the command, creating a new response incorporating the confirmation, where the new response is formatted according to the first protocol associated with the remote device and sending the new response to the remote device.

2. The method of claim 1, wherein the remote device is a cell phone and the first message is a text message.

3. The method of claim 1, wherein the LBS device is one of an automotive tracking device, a personal tracking device, a pet tracking device, a cargo/container tracking device, a fleet vehicle tracking device, an emergency locator beacon, and a security/fire alarm monitoring device.

4. The method of claim 1, wherein the pass code is a predetermined PIN.

5. The method of claim 1, wherein the LBS device is disposed in a motor vehicle and the command includes one of locate vehicle, disable starter, enable starter, and unlock doors.

6. The method of claim 1, wherein the second protocol comprises one of short messaging service, general packet radio service, code division multiple access, user datagram protocol, and extensible markup language.

7. The method of claim 1, wherein the new response further comprises at least one of a time of the confirmation, an address of the LBS device, a speed of the LBS device, and a direction of the LBS device.

8. A non-transitory computer-readable medium for transferring electronic communications between a remote device and a location-based service (LBS) device, where the remote device communicates in a first protocol that is incompatible with a second protocol in which the LBS device communicates, comprising instructions stored thereon, that when executed on a processor, perform the steps of:

receiving and storing into a memory of a computer a first message in the first protocol from the remote device, parsing information from the first message, wherein the parsing comprises, scanning the first message for an identifier of the LBS device to which the first message is directed, and storing the identifier in a database in the memory, scanning the first message for a pass code, and storing the pass code in the database in the memory, and scanning the first message for a command code, and storing the command code in the database in the memory, processing the information extracted from the first message, wherein the processing comprises, comparing the identifier to a database of identifiers to confirm that the LBS device to which the first message is directed is associated with the computer and to identify the second protocol for the LBS device, and comparing the pass code to a database of pass codes to confirm that the message is authorized to be communicated, creating a new message comprising the command, where the new message is formatted according to the second protocol associated with the LBS device, sending the new message to the LBS device, continually checking for a first response from the LBS device, upon receipt of the first response from the LBS device, parsing the first response by scanning for a confirmation of execution of the command, creating a new response incorporating the confirmation, where the new response is formatted according to the first protocol associated with the remote device and sending the new response to the remote device.

9. The non-transitory computer-readable medium of claim 8, wherein the remote device is a cell phone and the first message is a text message.

10. The non-transitory computer-readable medium of claim 8, wherein the LBS device is one of an automotive tracking device, a personal tracking device, a pet tracking device, a cargo/container tracking device, a fleet vehicle tracking device, an emergency locator beacon, and a security/fire alarm monitoring device.

11. The non-transitory computer-readable medium of claim 8, wherein the pass code is a predetermined PIN.

12. The non-transitory computer-readable medium of claim 8, wherein the LBS device is disposed in a motor vehicle and the command includes one of locate vehicle, disable starter, enable starter, and unlock doors.

13. The non-transitory computer-readable medium of claim 8, wherein the second protocol comprises one of short messaging service, general packet radio service, code division multiple access, user datagram protocol, and extensible markup language.

14. The non-transitory computer-readable medium of claim 8, wherein the new response further comprises at least one of a time of the confirmation, an address of the LBS device, a speed of the LBS device, and a direction of the LBS device.

\* \* \* \* \*